United States Patent [19]
Saitoh et al.

[11] Patent Number: 5,141,249
[45] Date of Patent: Aug. 25, 1992

[54] AUTOMATIC SEAT-BELT APPLYING SYSTEM

[75] Inventors: Tsutomu Saitoh, Toyohashi; Yoshiharu Takanashi; Tatsuya Suzuki, both of Kosai, all of Japan

[73] Assignee: Asmo Co., Ltd., Shizuoka, Japan

[21] Appl. No.: 680,907

[22] Filed: Apr. 5, 1991

[30] Foreign Application Priority Data

Apr. 11, 1990 [JP] Japan ................................. 2-96980

[51] Int. Cl.⁵ ............................................ B60R 22/06
[52] U.S. Cl. .................................. 280/804; 280/807; 280/808; 297/469
[58] Field of Search ...................... 280/804, 808, 807; 297/469, 476, 477

[56] References Cited

U.S. PATENT DOCUMENTS

| | | | |
|---|---|---|---|
| 4,436,323 | 3/1984 | Yamamoto | 280/804 |
| 4,461,493 | 7/1984 | Doty | 280/807 |
| 4,478,433 | 10/1984 | Taguchi et al. | 280/807 |
| 4,494,709 | 1/1985 | Takada | 280/807 X |
| 4,547,717 | 10/1985 | Radermacher et al. | 280/808 X |
| 4,730,844 | 3/1988 | Patterson | 280/804 |
| 4,765,651 | 8/1988 | Unger | 280/808 X |
| 4,830,310 | 5/1989 | Higbee | 280/807 X |

FOREIGN PATENT DOCUMENTS

| | | |
|---|---|---|
| 58-14130 | 3/1983 | Japan . |
| 58-78845 | 5/1983 | Japan . |
| 58-101855 | 6/1983 | Japan . |
| 59-15725 | 5/1984 | Japan . |
| 63-13082 | 4/1988 | Japan . |
| 1-101252 | 4/1989 | Japan . |
| 1-223048 | 8/1989 | Japan . |

*Primary Examiner*—Robert P. Olszewski
*Assistant Examiner*—Dean A. Reichard
*Attorney, Agent, or Firm*—Oliff & Berridge

[57] ABSTRACT

The present invention provides an automatic seat-belt applying system for motorcars, comprising a guide rail located laterally relative to a seat and disposed on the vehicle body of a motorcar to extend along a path of movement of a seat belt and a self-propelled anchor movable along the guide rail for holding the seat belt at one end, the self-propelled anchor including a motor for moving the anchor along the guide rail, whereby the seat belt can be automatically applied around a crew sitting on the seat.

18 Claims, 9 Drawing Sheets

AUTOMATIC SEAT-BELT APPLYING SYSTEM

BACKGROUND OF THE INVENTION

1. Field of the Invention

The present invention relates to improvements in an automatic seat-belt applying system for motorcars.

2. Description of the Related Art

In motorcars, there have been used seat belts for protecting driver and passengers on road accident. Recently, a passive seat-belt system has been proposed which automatically applies seat belts (shoulder belts) on a crew when they sit on seats.

Figure 8A:
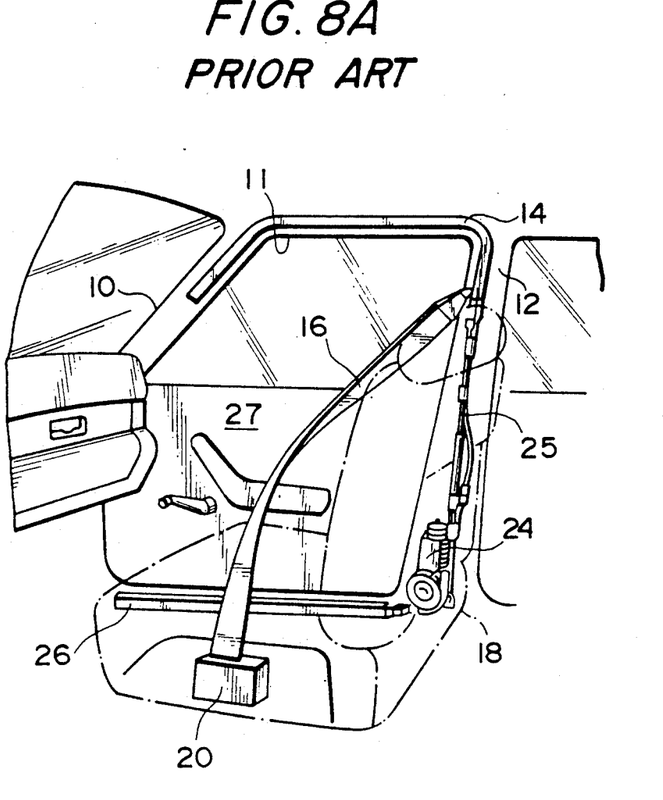
FIG. 8A is a view illustrating a passive seat-belt system constructed according to the prior art when it is mounted in a motorcar.

FIG. 8 shows one of the conventional passive seat-belt systems, which is mounted on the driver's seat. The system comprises a guide rail 14 extending from a front pillar 10 through a roof side panel 11 to a center pillar 12, as shown in FIG. 8A. The guide rail 14 receives one end of a seat belt 16 (shown as a shoulder belt) through a movable member. The other end of the seat belt 16 is mounted in a retractor 20 under a predetermined tension, the retractor 20 being disposed adjacent to the left side of a driver's seat 18 (or the right side of a driver's seat if a steering wheel is disposed the left side of a motorcar).

Figure 8B:
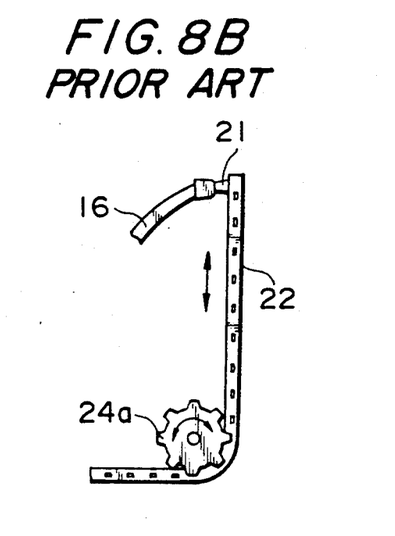
FIG. 8B is a view illustrating the detailed structure of the driving tape drive.

As shown in FIG. 8B, the movable member of the seat belt 16 comprises an anchor 21 and a driving tape 22. The driving tape 22 is drivingly connected to a belt motor 24 which is disposed on the lower portion of the center pillar 12. The driving tape 22 is guided by a tape guide 25 between the guide rail 14 and the belt motor 24. After the driving tape 22 has been moved, the remaining portion thereof is received within a tape casing 26.

The automatic seat-belt applying system is automatically adapted to actuate the belt motor 24 through any suitable switch means when a driver sits on his seat 18 and if a door 27 is closed. On actuation of the belt motor 24, a sprocket 24a on the output shaft of the belt motor 24 is rotated to draw the driving tape 22, thereby tensioning the seat belt 16.

Thus, the one end of the seat belt 16 retracted in the front pillar 10 will be moved to a predetermined position in the center pillar 12 along the guide rail 14. During this movement, the seat belt 16 is applied to the driver while being drawn out from the retractor 20. When the one end of the seat belt 16 reaches said predetermined position in the center pillar 12, the anchor 21 is fixed to an anchor fixture (not shown) to complete the application of the seat belt.

If the driver wants to get out of the motorcar, he may actuate any suitable switch means to rotate the sprocket 24a in the opposite direction so that the driving tape 22 will be moved in the opposite direction to return the one end of the seat belt 16 to its original position in the front pillar 10. In this connection, the driving tape 22 can be replaced by any other suitable means such as wire or the like.

The other techniques for automatically applying the seat belt on the crew are disclosed, for example, in Japanese Utility Model Publication Nos. Sho 58-14130 and Sho 63-13082.

All these known techniques have the following disadvantages:

(1) The conventional automatic seat-belt applying systems are customary to perform the movement of the seat belt 16 by utilizing the driving tape 22 or wire so as to slidably move the one end of the seat belt 16 on the guide rail 14. This creates much loss of friction on moving the seat belt 16, resulting in increase of the capacity of the belt motor 24. There is required to secure an additional space which receives the driving tape 22.

(2) Since the seat belt 16 used is a shoulder belt, it is preferred that the anchor 21 (FIG. 8B) holding the one end of the seat belt 16 can be adjusted in height for the driver's sitting height. Although such an adjustment of the anchor's height has been proposed as by Japanese Patent Laid-Open Nos. Hei 1-101252 and Hei 1-223048, they are adapted to adjust the height of the anchor manually stepwise, for example, through three steps. This renders the adjusting operation complicated and also enables only rough adjustment to be performed. In such a case, it may be considered that in addition to the belt motor 24, an anchor driving motor for automatically moving the anchor is provided. As seen from FIG. 8, however, the provision of the driving tape 22 eliminates the possibility of any space for receiving such an anchor driving motor. Moreover, it is difficult in mechanism to provide the two different motors and associated transmission means in the limited space.

(3) In the prior art, furthermore, the seat belt 16 is wound by a retractor 20 under the action of a spring. Thus, the wound seat belt 16 is placed under a predetermined tension by means of the spring in the retractor 20. When the seat belt is applied to the driver, therefore, an oppressive sensation will be exerted about the body of the driver wound by the seat belt. Furthermore, the capacity of the belt motor 24 must be increased to draw the seat belt 16 against the tension applied thereto.

SUMMARY OF THE INVENTION

In view of the aforementioned problems in the prior art, it is a first object of the present invention to provide an automatic seat-belt applying system which can easily and simply be mounted in motorcars and which can be actuated even by a reduced-size motor.

A second object of the present invention is to provide an automatic seat-belt applying system of the above type which can automatically adjust an anchor in height with fine adjustment steps.

A third object is to provide an automatic seat-belt applying system which will not provide any oppressive sensation to the crew through a seat belt when tightened and which can reduce load on motors used therein.

To this end, the present invention provides an automatic seat-belt applying system which comprises a guide rail located beside a seat in a motorcar and extending along a path on which one end of a seat belt is moved, and an anchor movable along said guide rail, said anchor holding said one end of the seat belt, said anchor being of a self-propelled type which is driven by a motor mounted in said anchor itself, whereby said seat belt can be automatically applied about the body of a crew sat on his seat.

The present invention also provides an automatic seat-belt applying system comprising height adjusting means for adjusting the height of an anchor holding portion to be mounted, said height adjusting means including a height adjusting motor to adjust the height of said anchor holding portion to regulate the height of the seat belt to be applied on the crew.

The present invention further provides an automatic seat-belt applying system comprising a motor-operated retractor which includes a seat-belt winding motor for holding the seat belt at the other end and for winding the seat belt from the other end, said motor-operated retractor being controlled such that the seat belt can be drawn out with a reduced tension.

In accordance with the present invention, the self-propelled anchor runs on the guide rail to draw the seat belt at its one end, whereby the seat belt can be applied about the body of the crew.

In accordance with the present invention, furthermore, the one end of the seat belt will be moved on the guide rail by the self-propelled anchor and locked at the anchor fixture. The anchor can be adjusted in height by driving the height adjusting means by the adjusting motor, such that the adjustment of height will match the one end of the seat belt with the crew's sitting height.

Since the self-propelled anchor moves on the guide rail to draw the one end of the seat belt, the seat belt is drawn out of the retractor. At this time, substantially no tension will be applied to the seat belt. Thus, the seat belt can be easily drawn out of the retractor. In such a manner, the crew will not be clamped by any excessive force when the seat belt is applied on the crew.

DETAILED DESCRIPTION OF PREFERRED EMBODIMENTS

The present invention will be described in connection with one embodiments with reference to the drawings.

Figure 1:
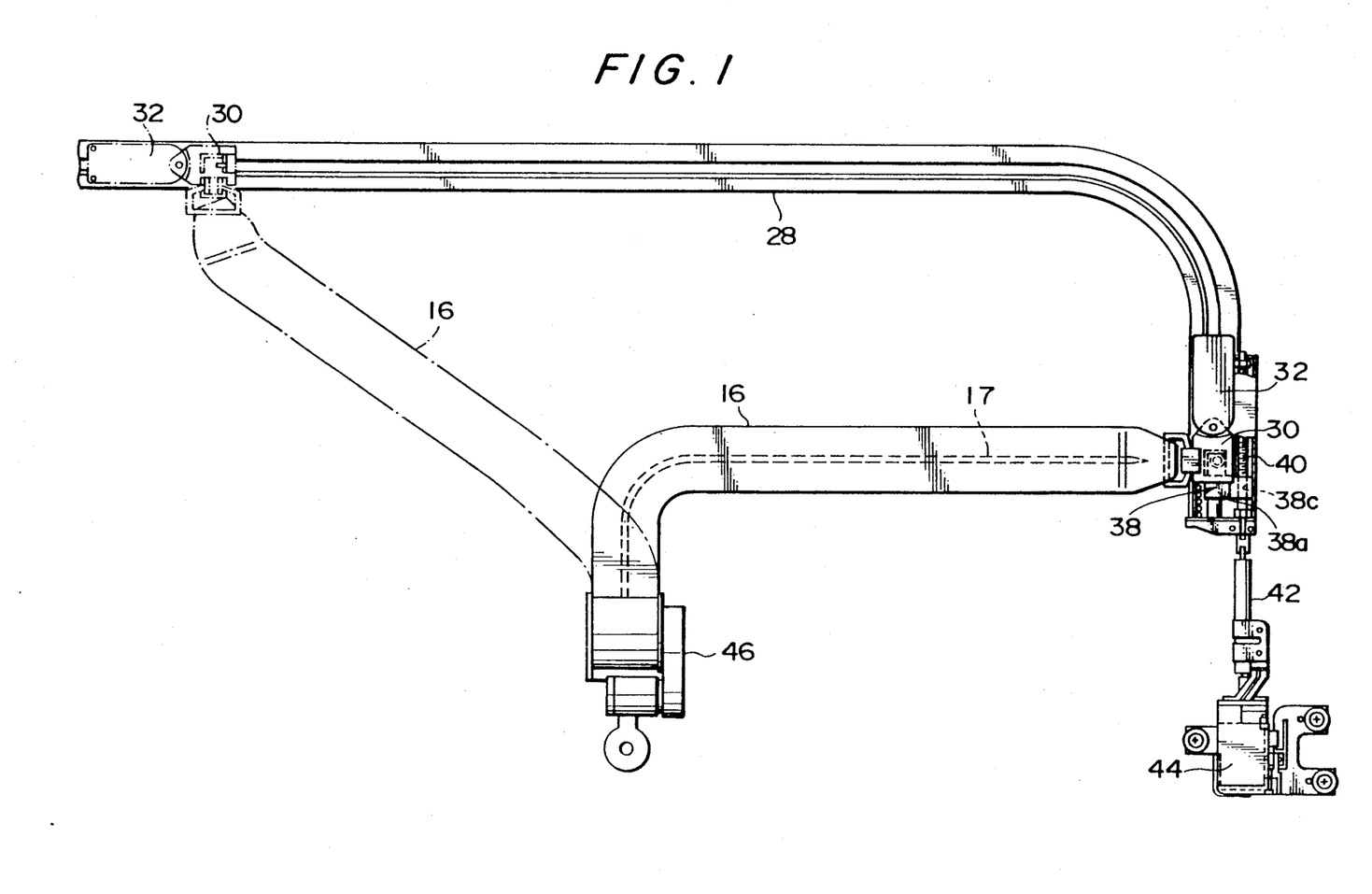
FIG. 1 is a view illustrating the schematic diagram of one embodiment of an automatic seat-belt applying system constructed in accordance with the present invention.
Figure 2:
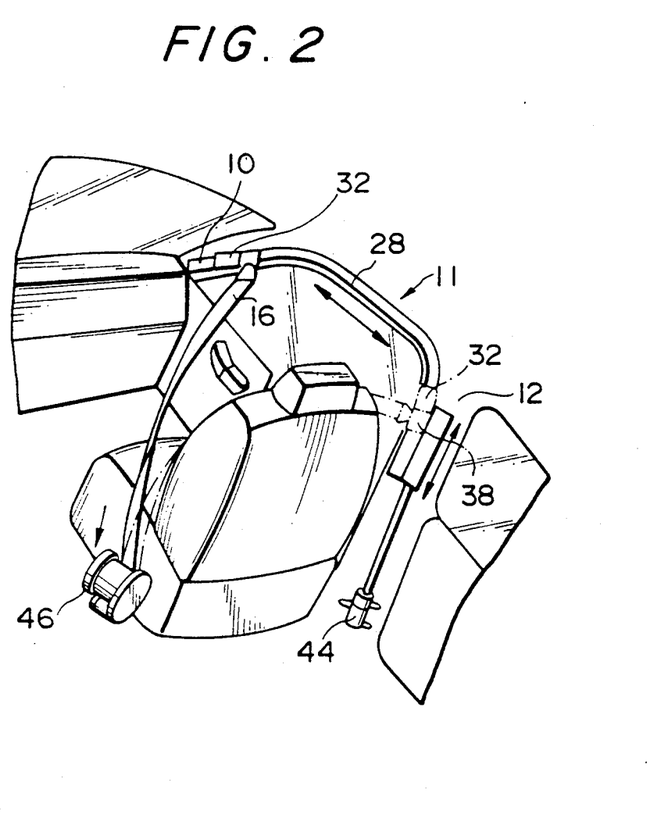
FIG. 2 is a perspective view of the system shown in FIG. 1 which is actually mounted in a motorcar.

Referring to FIG. 1, there is shown an automatic seat-belt applying system constructed in accordance with the present invention. FIG. 2 shows such a system when it is mounted in a motorcar at its driver's seat.

The automatic seat-belt applying system is shown as associated with a seat belt 16 in the form of a passive shoulder belt. The system comprises a guide rail 28 arranged to extend from a front pillar 10 located on the right side of a driver seat through a roof side panel 11 to a center pillar 12 as shown in FIG. 2. The guide rail 28 movably receives the seat belt 16 at one end. For such a purpose, the guide rail 28 movably supports a self-propelled anchor 32 such that it can move along the guide rail 28. The self-propelled anchor 32 includes a portion 30 engageable with an anchor holding portion, the engageable portion 30 being connected with the one end of the seat belt 16.

Figure 3:
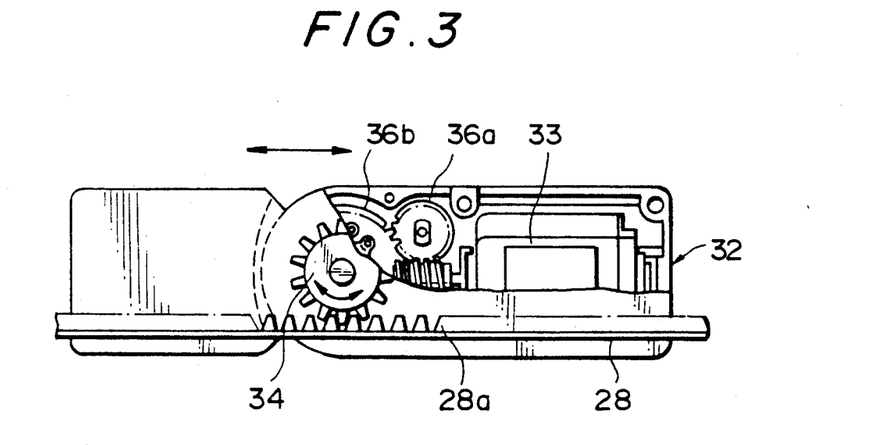
FIG. 3 is a schematic diagram of a self-propelled anchor.

As shown in FIGS. 3 and 4, the self-propelled anchor 32 is driven by a DC motor contained in the anchor itself through a rack-pinion mechanism similarly contained in the anchor itself. In this connection, FIGS. 3 and 4 are as viewed in the opposite direction.

More particularly, the self-propelled anchor 32 comprises a tape-shaped rack 28a mounted on the inside of the guide rail 28 and extending along the length of the guide rail 28, a passive motor 33 consisting of a DC motor, and a pinion 34 operatively connected with the passive motor 33 through gears 36a and 36b and drivingly engaging the rack 28a. When the passive motor 33 is energized forwardly and backwardly, the self-propelled anchor 32 can be reciprocated on the guide rail 28.

In the illustrated embodiment, an anchor holding portion 38 is provided on the center pillar 12, as shown in FIG. 1. As will be described hereinafter in more detail, the anchor holding portion 38 includes a latching portion which will be engaged by an engaging portion 30 formed in the self-propelled anchor 32 to lock the self-propelled anchor 32 so that the seat belt 16 will be automatically applied on the driver.

The anchor holding portion 38 includes a height adjusting mechanism for adjusting the height of the anchor holding portion 38. The height adjusting mechanism includes a screw drive mechanism which has a screw 40 for moving the anchor holding portion 38 in the vertical direction when the screw 40 is rotated. The screw 40 is rotatably driven by a reversible adjustment motor 44 which is disposed below the center pillar 12. The adjustment motor 44 is connected with the screw 40 through a coupling 42.

As shown in FIG. 2, a motor-driven retractor 46 is mounted on the driver's seat at the left side. The other end of the seat belt 16 is connected with the motor-driven retractor 46 so that the seat belt 16 can be rolled in the retractor 46. The motor-driven retractor 46 is designed such that when the seat belt 16 is rewound out of the retractor 46 under the movement of the self-propelled anchor 32, this winding can be made without load or with less load. The motor-driven retractor 46 is further designed such that after the seat belt 16 has been applied around the driver and when the motion of the driver causes the seat belt 16 to loosen, the completion of application of the seat belt is detected to energize the motor in a direction that the loosened portion of the seat belt 16 will be wound into the retractor 46.

Various parts of the system will now be described in operation sequentially.

Figure 4A:
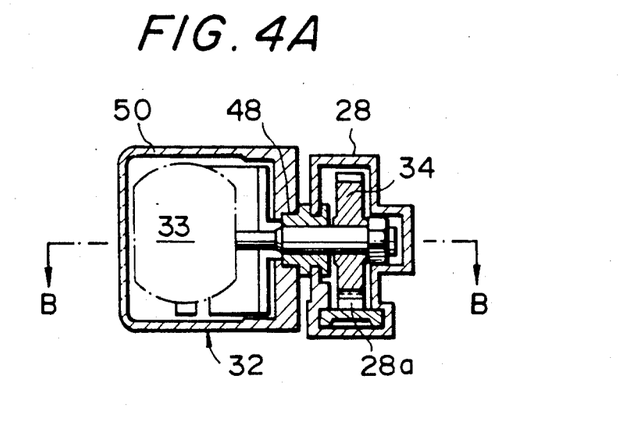
FIG. 4A is a cross-sectional view of the self-propelled anchor as viewed in the direction of vehicle movement.
Figure 4B:
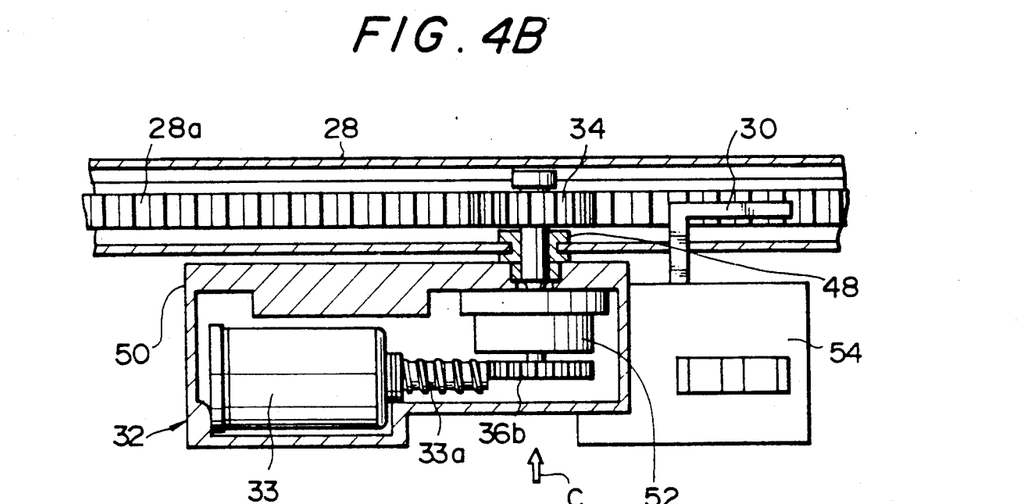
FIG. 4B is a cross-sectional view of the self-propelled anchor, taken along a line b—B in FIG. 4A.
Figure 4C:
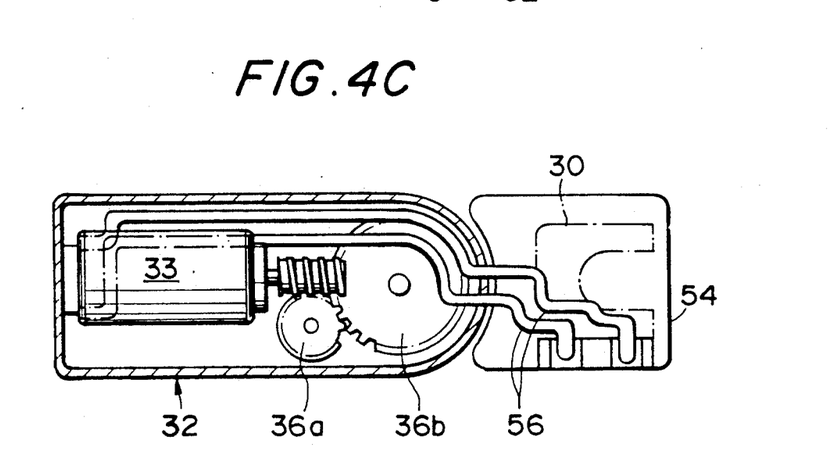
FIG. 4C is a cross-sectional view of the self-propelled anchor as viewed from arrow C in FIG. 4B.

FIG. 4 illustrates the details of the self-propelled anchor 32: FIG. 4A shows a cross-sectional view of the guide rail 28 and self-propelled anchor 32 as viewed from the direction of movement of the anchor 32; FIG. 4B shows a cross-sectional view of the same components, taken along a line B—B in FIG. 4A; and FIG. 4C shows a cross-sectional view of the same components as viewed from an arrow C in FIG. 4B.

In the illustrated embodiment, the guide rail 28 supports the rack 28a extending along the length of the guide rail 28. The guide rail 28 contains the pinion 34 operatively engaging the rack 28a. The pinion 34 supports a housing 50 through a supporting member 48 mounted thereon. Thus, the housing 50 is slidably supported by the guide rail 28. The pinion 34 is drivingly connected with a gear wheel 33a fixed to the output shaft of the passive motor 33 through the gear wheels 36a and 36b. Thus, the rotation of the motor 33 is slowed down and transmitted to the pinion 34 through the gear wheels 36a and 36b. An electromagnetically operated clutch 52 is located between the pinion 34 and the gear wheel 36. When this clutch 52 is de-energized, the pinion 34 is freely rotated. It is thus possible to move the self-propelled anchor 32 manually so that the height thereof can be manually adjusted even after the self-propelled anchor 32 has been held by the anchor holding portion 38.

The housing 50, which contains the passive motor 33, includes a power supply socket 54 disposed thereon at the front side. As shown in FIG. 4C, the socket 54 is electrically connected with the passive motor 33 through leads 56. In the illustrated embodiment, a power cable 17 is incorporated into the seat belt 16, as shown in FIG. 1. This power cable 17 is electrically connected with the power supply socket 54 to permit the passive motor 33 to be energized.

The power supply socket 54 fixedly supports the aforementioned engaging portion 30 which is to be engaged by the anchor holding portion 38. The engaging portion 30 is disposed within the guide rail 28.

The passive motor 33 of the self-propelled anchor 32 may be replaced by any other suitable drive means such as ultrasonic motor, linear motor or the like. Moreover, the power cable 17 incorporated into the seat belt 16 may be replaced, for example, by electrical conductor means attached to the inside of the guide rail 28.

Figure 5A:
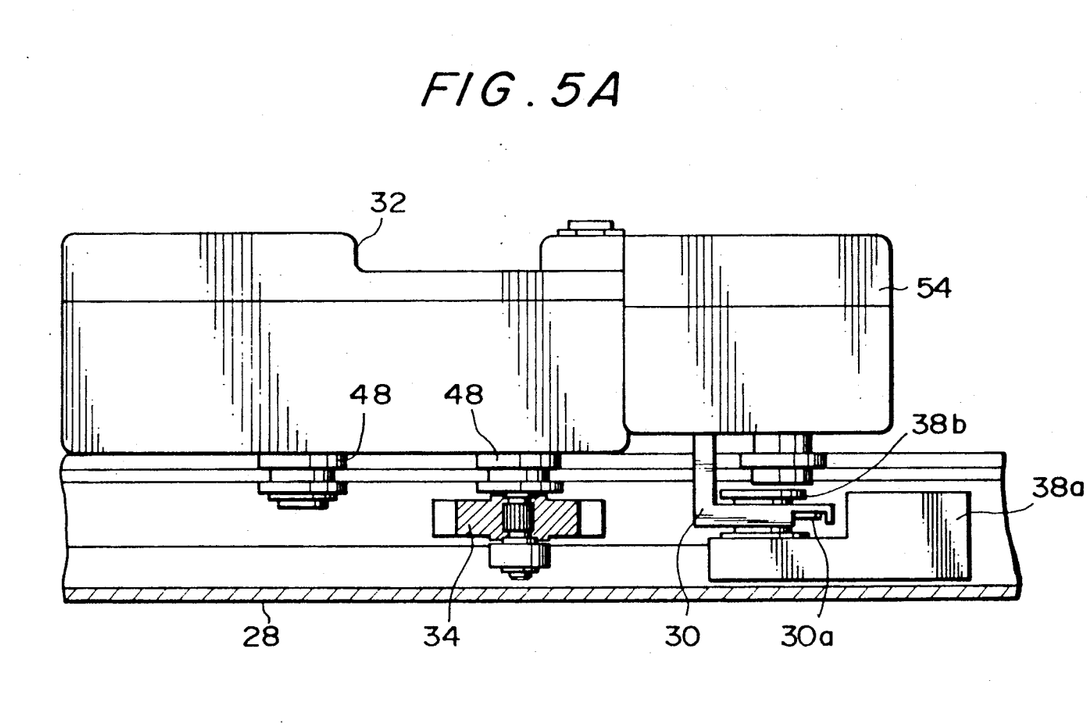
FIG. 5A illustrates the self-propelled anchor when it is locked in place, with the guide rail being shown in section.
Figure 5B:
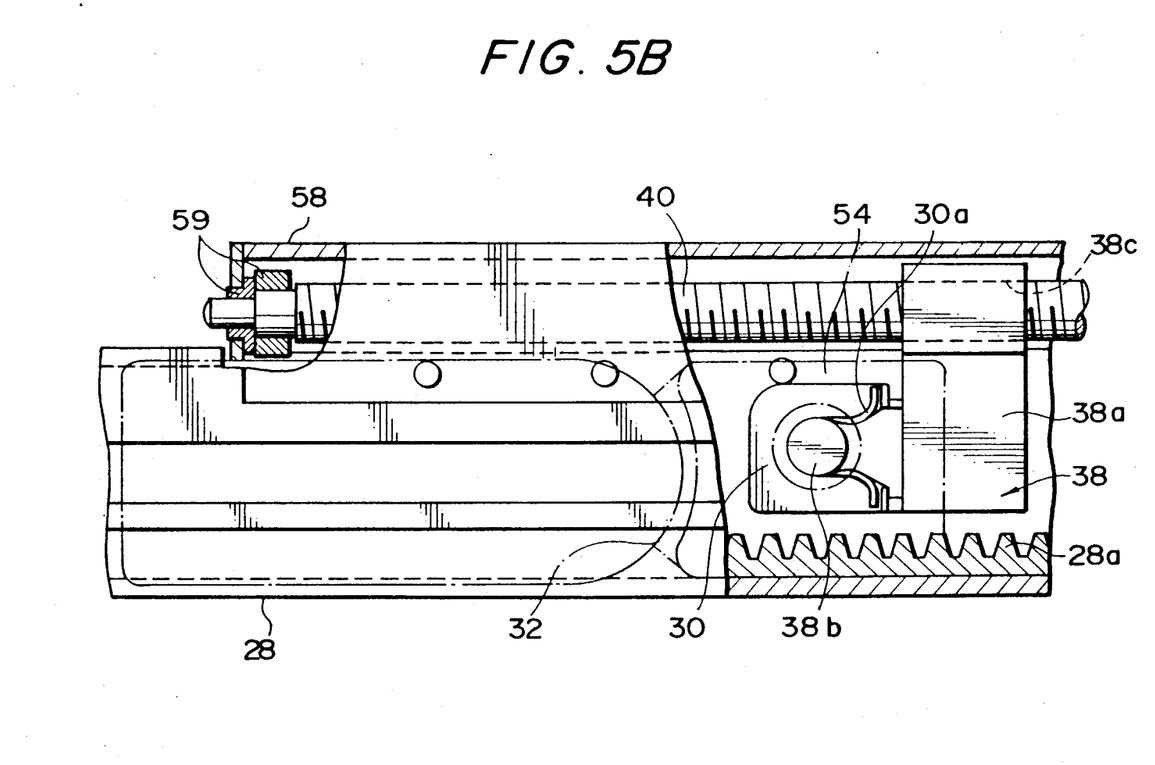
FIG. 5B is a front view illustrating, partially in section, the self-propelled anchor.

FIG. 5 shows the arrangement of the anchor holding portion and height adjusting mechanism, with the self-propelled anchor 32 being locked relative to the anchor holding portion 38.

As shown in FIG. 5A, the anchor holding portion 38 includes a pedestal 38a on which the aforementioned latching portion denoted by 38b is located. On the other hand, the engaging portion 30 of the self-propelled anchor 32 includes an engaging spring 30a mounted thereon. When the engaging spring 30a is engaged by the latching portion 38b, the self-propelled anchor 32 will be locked to the anchor holding portion 38.

Female threads 38c are formed on a portion of the pedestal 38a outwardly extending from the guide rail 28. The female threads 38c are threadingly connected over the screw 40. The screw 40 extends in the vertical direction substantially parallel to the guide rail 28 mounted on the center pillar 12 and rotatably supported at one end by a bearing 59 in a housing 58 attached to the guide rail 28. The other end of the screw 40 is connected with the adjustment motor 44 through the coupling, as described in connection with FIG. 1. When the adjustment motor 44 is energized, the anchor holding portion 38 fixed to the self-propelled anchor 32 will be moved in the vertical direction.

If the pinion 34 of the self-propelled anchor 32 is freely rotated by de-energizing the electromagnetic clutch 52, the self-propelled anchor 32 can be moved together with the anchor holding portion 38 on the guide rail 28 to adjust the height of the anchor easily and simply. Although the prior art can provide only three-stepped adjustment of height, the present invention can provide stepless height adjustment into any height such that the anchor for the seat belt 16 can be set at a height corresponding to any driver's sitting height.

The motor-driven retractor 46 shown in FIG. 1 includes a motor for winding the seat belt 16 from the other end thereof. The torque of such a motor required to wind the seat belt is set at a value required to wind only the loosened length of the seat belt 16 when it is applied on the driver.

Figure 6:
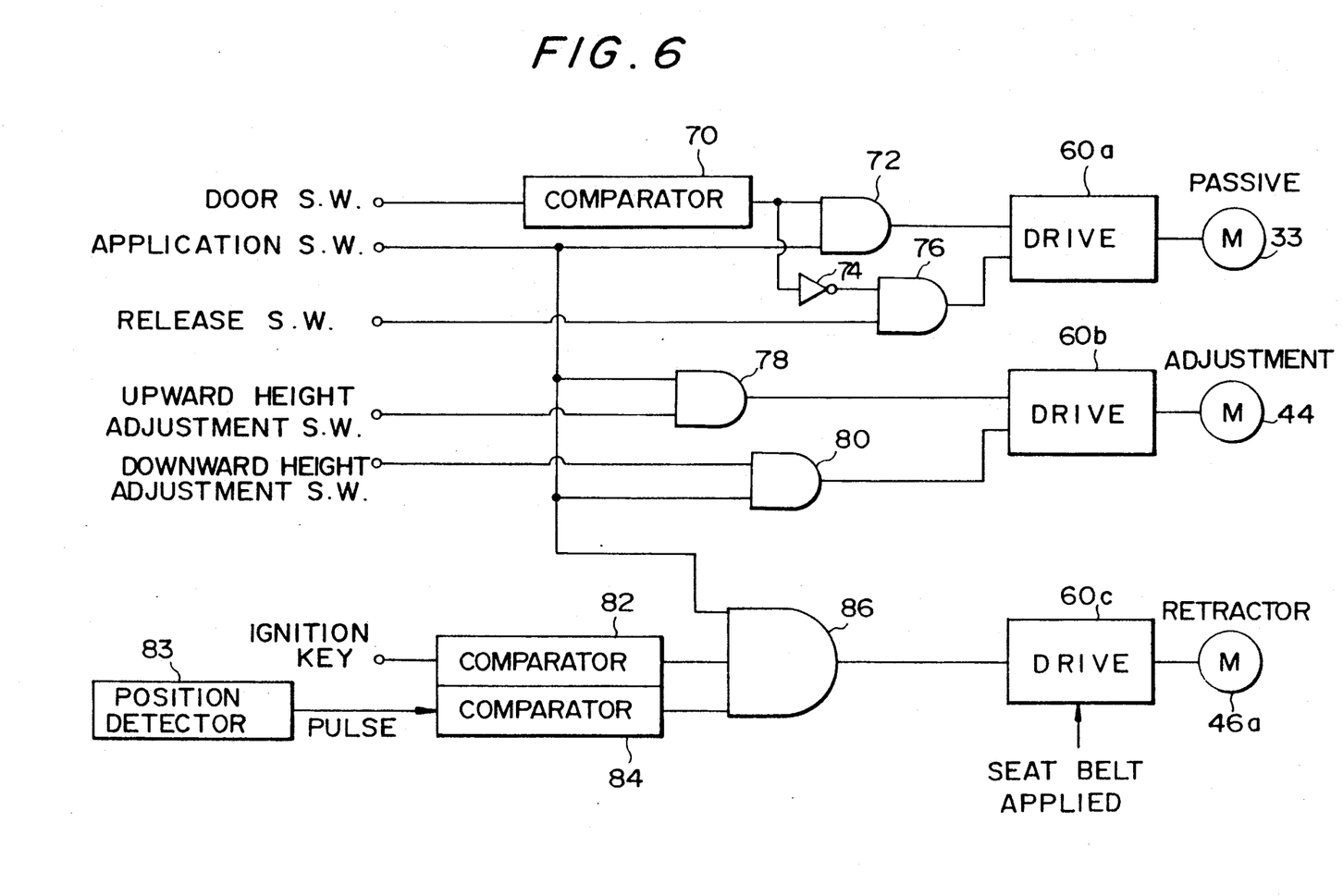
FIG. 6 is a circuit diagram illustrating the connections of various motor drive circuits.

The motor-driven retractor 46 further includes a position detector 83 contained therein (see FIG. 6). The position detector 83 detects the loosened belt portion created by the motion of the driver when the self-propelled anchor 32 is locked to the anchor holding portion 38 and after the application of seat belt has been completed. If the loosened length of the seat belt 16 reaches a predetermined value, the belt winding motor is energized to wind the seat belt 16 by the loosened length thereof.

In accordance with the present invention, the belt winding motor is in its off position when the seat belt 16 is pulled out for application. Thus, no tension will be exerted to the seat belt 16 when the seat belt 16 is pulled out of the retractor, in contrast with the prior art. The oppressive sensation to be exerted to the driver on application can be relieved and only very small force can be required to pull out the seat belt 16. This requires a reduced capacity in the motor for driving the anchor.

FIG. 6 schematically illustrates a circuit used to drive various motors in the automatic seat-belt applying system constructed in accordance with the present invention.

This circuit comprises a drive 60a for controlling the passive motor 33 in the self-propelled anchor 32; a drive 60b for controlling the adjustment motor 44; and a drive 60c for controlling the retractor motor 46a.

The drive 60a for controlling the passive motor 33 is controlled through a door switch for sensing the opening and closing of the driver's door, an application switch for commanding the application of the seat belt 16 around the driver, and a release switch for commanding the releasing of the seat belt. The output of the door switch is supplied to an AND gate 72 through a comparator 70. The other output of the comparator 70 is provided to an AND gate 76 through a gate 74. The output of the application switch is supplied to the AND gate 72 while the output of the release switch is applied to the AND gate 76. The outputs of these AND gates 72 and 76 are supplied to the drive 60a. If the door switch is in its ON state and the application switch is in its ON state, the AND gate 72 generates ON signal. At this time, for example, the drive 60a energizes the passive motor 33 to be rotated forwardly. If the door switch is in its OFF state and the release switch is in its ON state, the drive 60a energizes the passive motor 33 to be rotated backwardly.

The drive 60b for controlling the adjustment motor 44 is controlled by the output of an upward height adjustment switch for commanding the upward movement of the anchor holding portion 38, the output of a downward height adjustment switch for commanding the downward movement of the anchor holding portion 38 and the output of said application switch. The outputs of the application and upward height adjustment switches are supplied to the drive 60b through an AND gate 78. The output of the downward height adjustment switch is applied to the drive 60b through an AND gate 80 together with the output of the application switch. If the application switch is in its ON state and the upward height adjustment switch is in ON state, the drive 60b energizes the adjustment motor 44, for example, forwardly to make the upward movement of the anchor holding portion 38. On the other hand, if the application switch is in its ON state and the downward height adjustment switch is in its ON state, the adjustment motor 44 is energized to rotate backwardly to perform the downward movement of the anchor holding portion 38.

The drive 60c for controlling the retractor motor 46a is controlled through the output of an ignition switch, the output of the belt application switch and the output of the position detector 83. The output of the ignition switch and a winding command pulse from the position detector 83 are supplied to an AND gate 86 through comparators 82 and 84, respectively. The AND gate 86 also receives the output of the application switch. If the application switch is in its ON state and the ignition switch is in its ON state and when the position detector 83 generates a winding command pulse, the retractor motor 46a is energized responsively.

Figure 7:
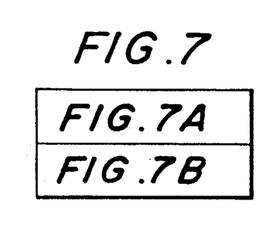
FIGS. 7, 7A, and 7B are a flow chart illustrating the operation of the automatic seat-belt applying system.
Figure 7A:
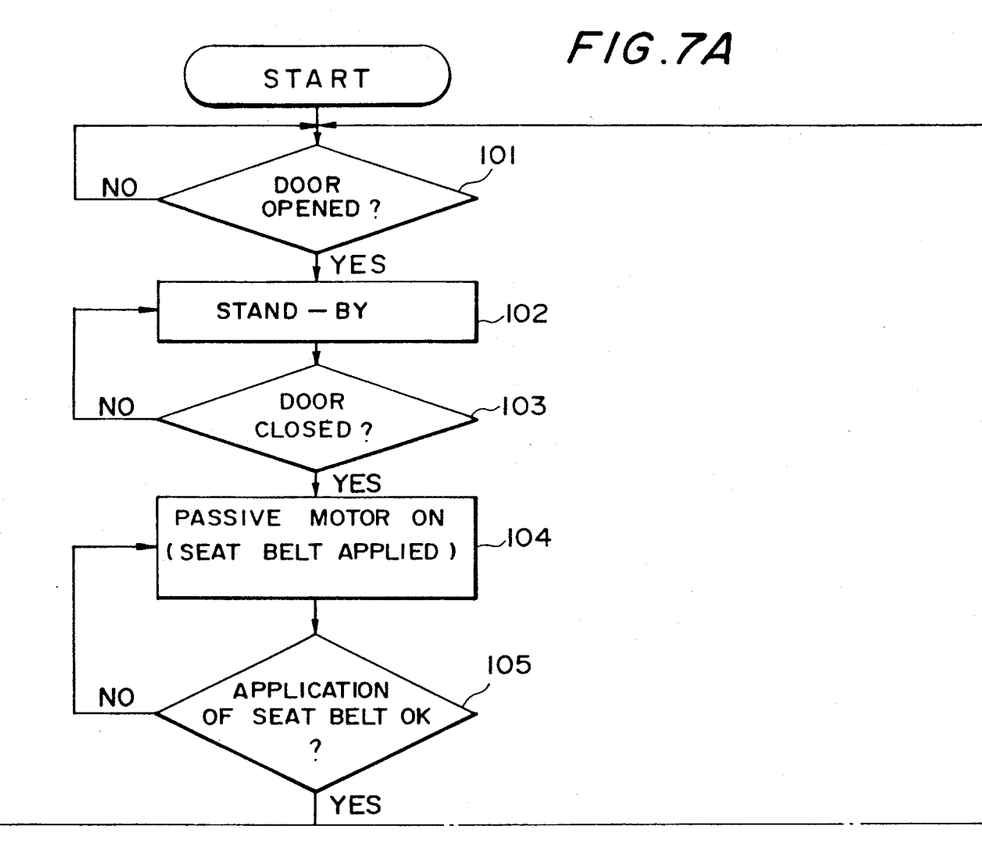
Figure 7B:
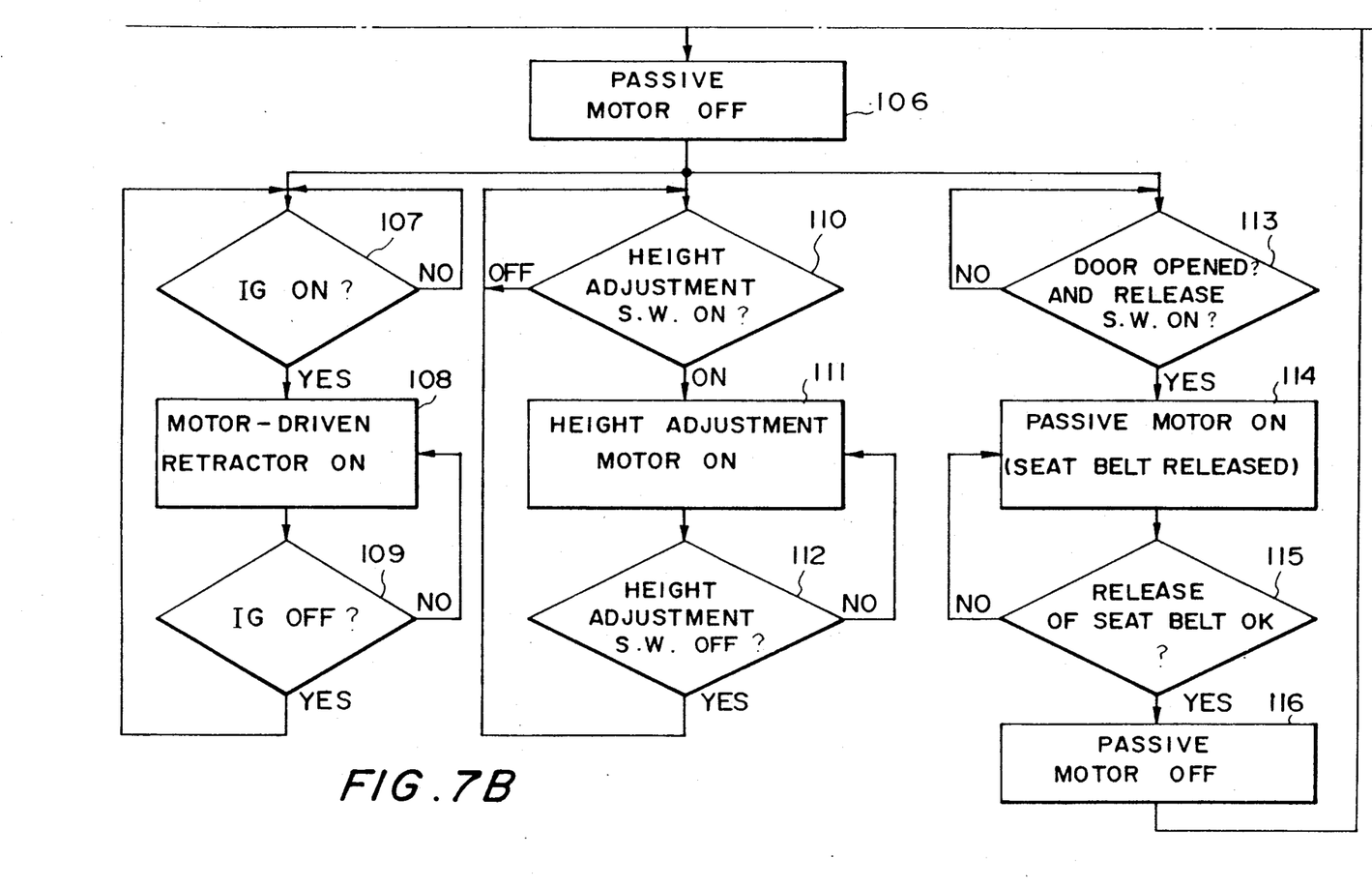

FIG. 7 is a flow chart for illustrating the operation of the automatic seat-belt applying system constructed according to the illustrated embodiment of the present invention. First of all, at Step 101, it is determined whether or not the door is opened. If it is determined that the door is opened, the program is placed at its stand-by state (Step 102) and thereafter judges whether or not the door is subsequently closed. If it is judged that the door is closed at Step 103, The program proceeds to the next Step 104.

At Step 104, the application switch is actuated to energize the passive motor 33 so that the seat belt 16 will be applied around the driver. The program then proceeds to Step 105 wherein the self-propelled anchor 32 is locked to the anchor holding portion 38. At the same time, it is judged whether or not the seat belt 16 is properly applied around the driver. If YES, the program proceeds to Step 106 wherein the passive motor 33 is deenergized.

Subsequently, the program proceeds to Steps 107, 110 and 113, respectively.

At Step 107, it is judged whether or not the ignition switch is in its ON state. If YES, the program proceeds to Step 108 wherein the motor-driven retractor 46 is energized, as described hereinbefore. More particularly, the position detector 83 in the retractor 46 detects the loosened length of the seat belt 16 which is created by the motion of the sitting driver. If such a state is detected by the position detector 83, it generates at its output a winding command pulse. In response to this winding command pulse, the motor-driven retractor 46 is energized to wind the seat belt 16 by the loosened length. If it is judged at Step 109 that the ignition switch is OFF, the program returns to the Step 107.

It is judged at Step 110 whether or not the height adjustment switch is its ON state. If the height adjustment switch is ON, UP or DOWN command is provided at Step 111 to rotate the adjustment motor 44 forwardly or backwardly. If it is judged at Step 112 that the height adjustment switch is in its OFF state, the program returns to Step 110.

At Step 113, it is further judged whether or not the door is opened and whether or not the release switch is turned on. If YES, the program proceeds to Step 114 wherein the passive motor 33 is energized to be rotated backwardly. Thus, the self-propelled anchor 32 will be returned to its original position on the front pillar 10 and the seat belt 16 may be released. It is then judged at Step 115 whether or not the seat belt 16 has been released. If YES, the program proceeds to Step 116 wherein the passive motor 33 is de-energized.

From the aforementioned description, it will be apparent that the seat belt is connected at one end with the self-propelled anchor. This eliminates any frictional loss as due to the prior art driving tape. Therefore, the present invention requires only a reduced-size motor for moving the seat belt. Furthermore, the present invention can provide an automatic seat-belt applying system which can be mounted more easily and simply in a motorcar without any cumbersome as in the prior art driving tape.

In accordance with the present invention, the self-propelled anchor may be adjusted in height by means of a motor. Thus, this adjustment can be automatically performed with fine stepless adjustment for the driver's sitting height.

The present invention is further advantageous in that the motors driving the anchor and retractor can be used to eliminate any oppressive sensation against the driver. This can also reduce load applied to the anchor driving motor, resulting in reduction of size in the motor used.

Although the preferred embodiment has been described as a two-point seat belt, the present invention is not limited to such an arrangement and may be applied similarly to any other type of seat belt such as three-point seat belt system.

We claim:

1. An automatic seat-belt applying system comprising a guide rail located laterally relative to a seat and disposed on the vehicle body of a motorcar to extend along a path of movement of a seat belt and a self-propelled anchor movable along said guide rail for holding said seat belt at one end, said self-propelled anchor including a motor for moving said anchor along said guide rail, whereby said seat belt can be automatically applied around a crew sitting on said seat, said self-propelled anchor further including a clutch means for releasing said self-propelled anchor from an output of said anchor driving motor, whereby said self-propelled anchor can be manually moved along and on said guide rail.

2. An automatic seat-belt applying system as defined in claim 1, further comprising an anchor holding portion for detachably holding said self-propelled anchor, said anchor holding portion being located in a region of said guide rail in which it is to be applied around the crew.

3. An automatic seat-belt applying system as defined in claim 2 wherein said guide rail region is formed such that said self-propelled anchor is permitted to move relative to said vehicle body in the vertical direction.

4. An automatic seat-belt applying system as defined in claim 3, further comprising height adjustment means for adjusting the height of said anchor holding portion in its mounting position, said height adjustment means including a height adjustment motor for driving said anchor holding portion to a desired height to perform the automatic adjustment of said seat belt with respect to its height at which said seat belt is applied around the crew.

5. An automatic seat-belt applying system as defined in claim 1 wherein said guide rail includes a rack extending along the length thereof and wherein said self-propelled anchor includes a pinion rotatably driven by said anchor driving motor, said pinion being engaged by said rack such that said self-propelled anchor can e moved on and along said guide rail.

6. An automatic seat-belt applying system as defined in claim 1, further comprising power supply line means extending along said seat belt and wherein said anchor driving motor is energized by an electric power supplied to said system through said power supply line means.

7. An automatic seat-belt applying system as defined in claim 1, further comprising an engaging portion on said self-propelled anchor, said engaging portion being releasably engaged by an anchor holding portion.

8. An automatic seat-belt applying system as defined in claim 1, further comprising a motor-driven retractor including a motor for holding said seat belt at the other end thereof and for winding said seat belt into said retractor from the other end of said seat belt and means for detecting a loosened length in said seat belt created due to the motion of the sitting crew after said seat belt has been applied around the crew, said motor-driven retractor being controlled by a drive circuit such that when said seat belt is to be applied around the crew, said seat belt can be pulled out of said retractor with a reduced tension and such that said detecting means energizes the seat belt winding motor to wind the loosened length of said seat belt when the loosened belt length reaches a predetermined value.

9. An automatic seat-belt applying system as defined in claim 1, further comprising a motor-driven retractor for holding said seat belt at the other end thereof, said retractor including a motor for winding said seat belt into said retractor from the other end of said seat belt, said motor-driven retractor being controlled by a drive circuit such that when said seat belt is to be applied around the crew, said seat belt can be pulled out of said retractor with a reduced tension.

10. An automatic seat-belt applying system as defined in claim 9 wherein said motor-driven retractor includes means for detecting a loosened length in said seat belt created due to the motion of the sitting crew after said seat belt has been applied around the crew, said detecting means being adapted to energize the seat belt winding motor to wind the loosened length of said seat belt when the loosened belt length reaches a predetermined value.

11. An automatic seat-belt applying system as defined in claim 9 wherein said motor-driven retractor de-energizes said belt winding motor such that said seat belt can be pulled out of said retractor with a reduced tension.

12. An automatic seat-belt applying system as defined in claim 3 wherein said self-propelled anchor includes an engaging portion releasably engaged by said anchor holding portion and wherein said anchor driving motor is energized by an electric power which is supplied to said system through power supply line means extending along said seat belt.

13. An automatic seat-belt applying system as defined in claim 4, further comprising a motor-driven retractor for holding said seat belt at the other end thereof, said retractor including a motor for winding said seat belt into said retractor from the other end of said seat belt, said motor-driven retractor being controlled by a drive circuit such that when said seat belt is to be applied around the crew, said seat belt can be pulled out of said retractor with a reduced tension.

14. An automatic seat-belt applying system as defined in claim 4 wherein said guide rail includes a rack extending along the length thereof and wherein said self-propelled anchor includes a pinion rotatably driven by said anchor driving motor, said pinion being engaged by said rack such that said self-propelled anchor can be moved on and along said guide rail.

15. An automatic self-belt applying system as defined in claim 14 wherein said height adjustment means can adjust the height of said anchor holding portion on which said self-propelled anchor is held when said clutch means is released from the output of said anchor driving motor.

16. An automatic seat-belt applying system as defined in claim 4 wherein said height adjustment means includes screw means extending in the vertical direction relative to said vehicle body, said screw means being rotatably drivable by said height adjustment motor, and female thread means formed in said anchor holding portion and drivingly engaged by said screw means, whereby the height of said anchor holding portion can be adjusted by rotatably energizing said height adjustment motor.

17. An automatic seat-belt applying system as defined in claim 16 wherein said height adjustment means can adjust the height of said anchor holding portion on which said self-propelled anchor is held when said clutch means is released from the output of said anchor driving motor.

18. An automatic seat-belt applying system as defined in claim 17 wherein said height adjustment motor is located below said anchor holding portion, wherein said screw means extends substantially parallel to said guide rail region at which said seat belt is to be applied around the crew and also vertically relative to the vehicle body, said screw means being drivingly connected with said height adjustment motor through coupling means and wherein said female thread means is formed in a pedestal on said anchor holding portion such that said female thread means can be drivingly engaged by said screw means.

* * * * *